July 19, 1932.  E. HUFF  1,867,884
WEB SHEARING APPARATUS
Filed June 18, 1931
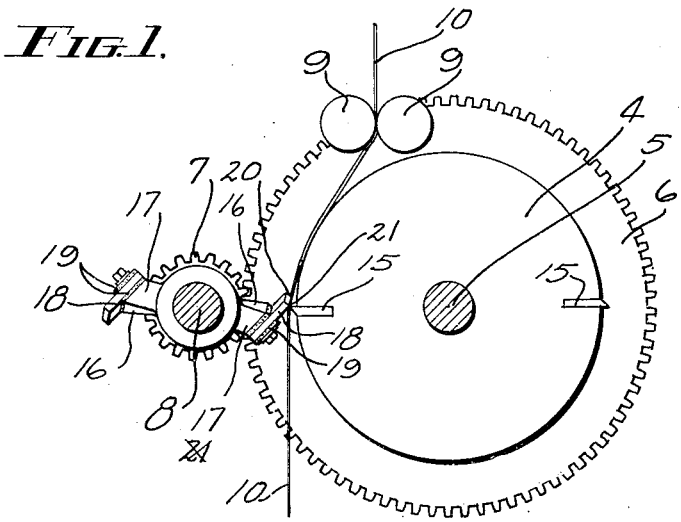
Fig. 1.
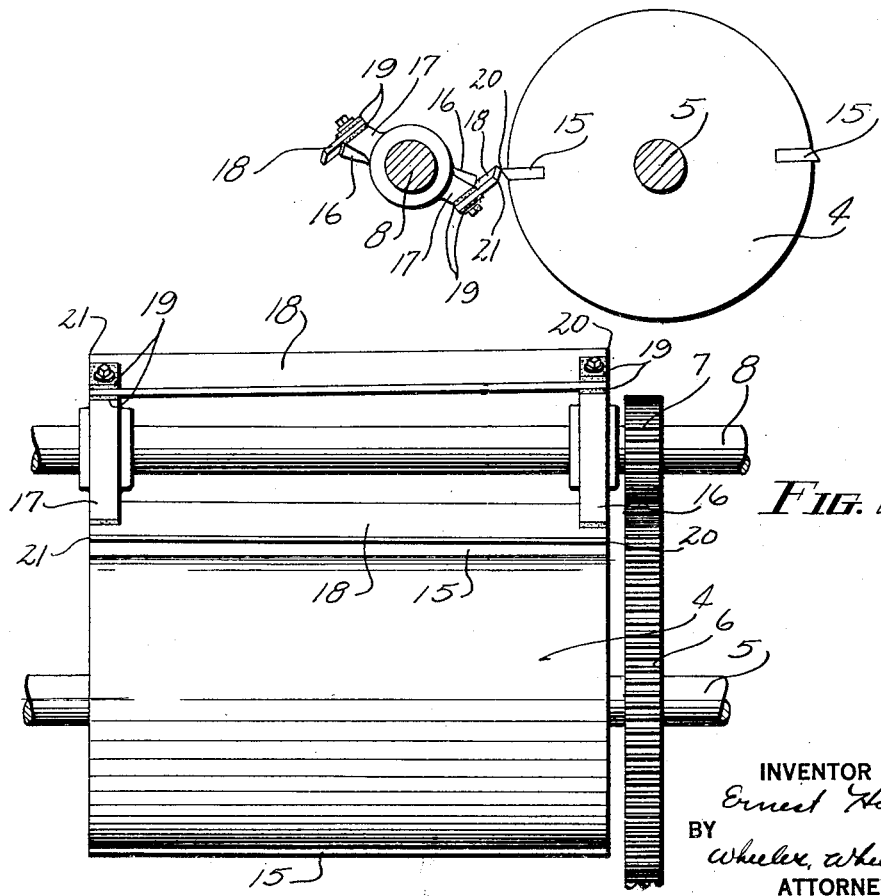
Fig. 2.
Fig. 3.
INVENTOR
Ernest Huff
BY
Wheeler, Wheeler & Wheeler
ATTORNEYS Patented July 19, 1932                                             1,867,884

UNITED STATES PATENT OFFICE

ERNEST HUFF, OF MILWAUKEE, WISCONSIN, ASSIGNOR TO AMERICAN LACE PAPER COMPANY, OF MILWAUKEE, WISCONSIN, A CORPORATION OF WISCONSIN

WEB SHEARING APPARATUS

Application filed June 18, 1931. Serial No. 545,204.

This invention relates to improvements in web shearing apparatus.

It is the primary object of the invention to provide novel, simple means operable at high speeds on thin webs to produce a clean shear cut for severing napkin or other blanks from the web upon which the device acts.

The problems involved in paper conversion are such that it is very difficult to make a clean cut at high speed, particularly when dealing with thin paper webs such as are used in napkin manufacture. The present invention seeks to overcome difficulties heretofore experienced by the use of rotary knives, one of which moves at the speed of the web and the other of which is operated at a much higher speed and has a shape adapting it to handle the displacement of the slower moving knife or die during the time interval required for the faster moving blade to complete its cut.

In the drawing:

Figure 1 is a transverse section through adjacent shafting showing the co-acting knives in side elevation at the moment of commencing a cut.

Figure 2 is a similar view showing the parts in the position which they occupy at the completion of the cut.

Figure 3 is a plan view of the parts shown in Fig. 1.

Like parts are identified by the same reference characters throughout the several views.

The die roll 4 is mounted on a driving shaft 5 carrying a gear 6 meshing with a relatively much smaller pinion 7 on driven shaft 8. Rolls 9 may be used to guide the web 10 to the die roll 4, the disposition of the severed sheet being unimportant to this invention.

Roll 4 carries relatively slowly moving shear blades or die members 15. Shaft 8 is provided with angularly offset axially spaced arms 16 and 17 which are arranged in pairs to support blades 18 for interaction with the die blades 15. In practice, the blades 18 are preferably yieldably cushioned by pads 19 for very limited movement with a long helical pitch, as is clearly shown in Figs. 1 and 2 and, in addition, their respective trailing corners 20 are at greater radius from the axis of shaft 8 than their respective leading corners 21.

The gear ratio between gear 6 and pinion 7 is preferably such that the shaft 8 will turn approximately five times in the course of one rotation of shaft 5. There being two die blades 15 in roll 4, it will be obvious that one of these blades will be presented for a cutting operation each time shaft 8 makes two and one half revolutions. Thus, the blades 18 act alternately, each co-operating with a particular die blade 15 but each being required to pass the cutting position a plurality of times when no die blade is presented.

In referring to the fact that corner 20 of each blade trails behind corner 21 thereof, reference has been made to the apparent helical pitch of the blade. In practice it has been found more satisfactory to make the blade rectilinear. The deviation from a true helix is very slight, and apparently the yieldable mounting of the blades compensates for any irregularity more perfectly than it has been possible to form a helical edge on the blade. The higher rate of operation of blades 18 as compared with die blades 15, results in a clean shearing cut, and the increased radius of the trailing edge of the shear blades not only maintains firm contact between the blades, but compensates for the slight recession made by the die blade in its arcuate movement during the cutting stroke.

The cutting edges of the blades have an unusually long life, and it is thought that wear is compensated to some degree by centrifugal displacement of the cutting margins of the shear blades 18 in the course of operation of the cutter which includes such blades. It will be noted that these blades are mounted obliquely with reference to radii drawn outwardly from shaft 8 through the point of mounting, and the mounting is near the rear margins of the respective blades, so that the cutting edges of the blades act with considerable mechanical advantage upon the cushions 19.

Providing the number of blades and their rate of operation is such that the shear blades are mechanically synchronized with the movement of the die blades, many other relative rates of operation may be used for accomplishing the purposes of this invention. It is even practicable to operate the shear blades in a direction opposite to the motion of the web, in which case the relative rate at which the blades meet and pass each other will necessarily be quite high. The relative rates and dimensions shown, however, have been found particularly satisfactory in practice, and it should be noted that in this art discrepancies apparently minor in nature frequently control the success of the operation.

I claim:

1. The combination with die blades and shear blades and shafts rotatably supporting the respective blades, of means for feeding a web between said shafts, and driving connections for the respective blades mechanically synchronizing their motion for co-operative inter-action of shear blades with die blades, said connections having a driving ratio productive of materially differing relative movement of said blades, whereby a shear blade will pass a co-operating die blade for the shearing of said web within a very limited distance of web advance.

2. The combination with die blades and shear blades and shaft supporting the respective blades, of means for driving one of said shafts at a rate materially in excess of the rate of operation of the other.

3. In a web cutting device, the combination with a die blade and a shear blade each mounted for rotation, and means for rotating one of said blades faster than the other, of means for delivering a web therebetween, one of said blades having one of its ends advanced in the direction of its rotation with respect to its other end.

4. In a web cutting device, the combination with a die blade and a shear blade each mounted for rotation, and means for rotating one of said blades faster than the other, of means for delivering a web therebetween, one of said blades having one of its ends advanced in the direction of its rotation with respect to its other end, the more advanced end of said blade being at a lesser radius than the less advanced end of said blade.

5. The combination with a die roll provided with a cutting blade, of a co-acting cutting means operatively driven at a higher rate of speed than said roll and including a shear blade mounted to co-act with said die blade and yieldably mounted.

6. The combination with a die roll provided with a cutting blade, of a co-acting cutting means operatively driven at a higher rate of speed than said roll and including a shear blade mounted to co-act with said die blade and yieldably mounted, said shear blade having one of its ends leading in the direction of rotation as compared with the other.

7. The combination with a die roll provided with a cutting blade, of a co-acting cutting means operatively driven at a higher rate of speed than said roll and including a shear blade mounted to co-act with said die blade and yieldably mounted, said shear blade having one of its ends leading in the direction of rotation as compared with the other, the leading end of the shear blade being of lesser radius than the trailing end thereof.

8. In a web severing device, the combination with a revoluble die blade and a revoluble shear blade synchronized for co-action therewith and provided with a rectilinear cutting edge inclined with reference to its axis of revolution, of a yieldable support for said shear blade provided with driving connections for operating said shear blade at a greater peripheral speed than said die blade at the time of interaction.

9. In a web severing device, the combination with a revoluble die blade and a revoluble shear blade synchronized for co-action therewith, of a support for said shear blade provided with driving connections for operating said shear blade at a greater peripheral speed than said die blade at the time of interaction, said die blade being disposed obliquely with reference to a radius drawn to it from its axis of revolution, and being also inclined as to its cutting edge with reference to said axis, and advanced at one end beyond the other in the direction of its revolution.

10. In a web severing device, the combination with a die roll provided with a die blade, of a shaft geared to said roll, supports mounted on the shaft for revolution therewith, cushion mountings carried by said supports and shear blades fastened adjacent their rear margins upon said mountings and having their front margins projecting obliquely with reference to radii from said shaft.

11. In a web severing device, the combination with a die roll provided with a die blade, of a shaft geared to said roll, supports mounted on the shaft for revolution therewith, cushion mountings carried by said supports and shear blades fastened adjacent their rear margins upon said mountings and having their front margins projecting obliquely with reference to radii from said shaft, one end of each such blade being advanced in the direction of revolution of the shaft with respect to its other end and being at a lesser radial distance from the shaft.

ERNEST HUFF.